L. F. CARLE.
TOOL FOR PUTTING ON AND REMOVING PNEUMATIC TIRES.
APPLICATION FILED MAR. 19, 1909.
965,076.
Patented July 19, 1910.
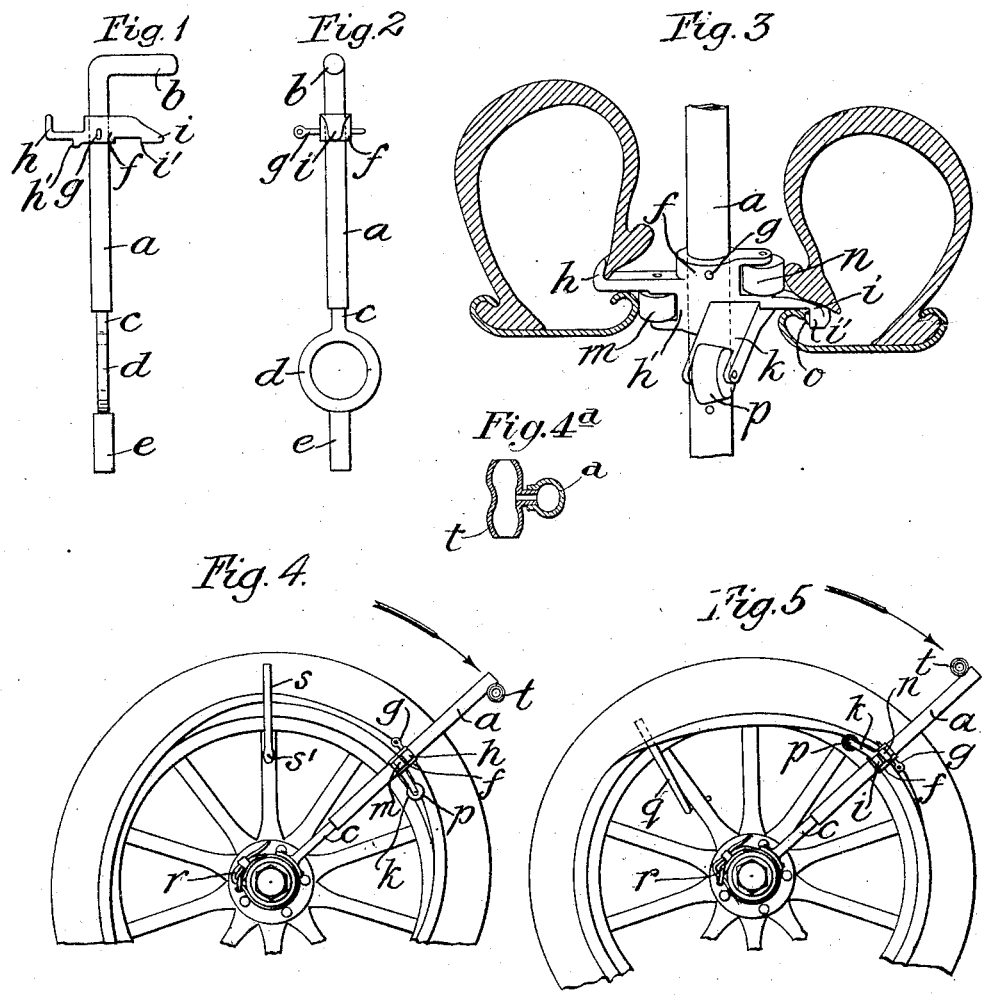
WITNESSES:
INVENTOR:
Louis Felix Carle,
By his Attorneys

UNITED STATES PATENT OFFICE.

LOUIS FELIX CARLE, OF COURBEOVIC, FRANCE.

TOOL FOR PUTTING ON AND REMOVING PNEUMATIC TIRES.

965,076.  Specification of Letters Patent.  Patented July 19, 1910.

Application filed March 19, 1909. Serial No. 484,480.

*To all whom it may concern:*

Be it known that I, LOUIS FELIX CARLE, a citizen of the Republic of France, residing in Courbeovic, Seine, France, have invented a new and useful Improvement in Tools for Putting On and Removing Tires, of which the following is a specification.

The present invention has for its subject a tool for facilitating the attachment and detachment of pneumatic tires. The said tool also allows of preventing damage to the cover or jamming of the air tube between the rim and the cover, an accident which frequently occurs with the tools usually employed and causes bursting of the air tube.

The following description with reference to the accompanying drawing will enable the construction and operation of the device to be well understood.

Figures 1 and 2 show the tool in side view and front view respectively; Fig. 3 is a perspective view of a modification; Figs. 4 and 5 are views on a smaller scale illustrating the use of the tool in putting on and detaching a pneumatic tire; Fig. 4ᵃ is a transverse section of the outer end of the tool of Figs. 4 and 5. Fig. 6 is a plan view of another form of the apparatus; Figs. 7 and 8 are perspective views of hooks which may be employed to facilitate the use of the tool.

The apparatus consists of a tube $a$ having a handle $b$ at the end and in which slides a rod $c$ formed or provided with a ring $d$ which may itself be provided if required with a handle $e$. As will be understood, the sliding rod $c$ serves to vary the length of the apparatus to adapt it to wheels of different diameters.

On the tube $a$ is fixed, by means of a pin $g$ for example, a cross piece $f$ bent up at right angles at the end $h$ to form a hook. At the same side the cross piece is made with a shoulder $h'$ below, designed to bear against the outer flange or face of the rim during dismounting of the tire, as hereinafter described. On the other side the cross piece is extended to provide a bearing member in the form of an inclined plane $i$ and having a shoulder $i'$ beneath adapted to bear against the interior edge or face of the rim in putting on the tire.

The operation of this apparatus is as follows:—To remove a pneumatic tire the bead of the cover is first as shown in Fig. 5 pushed out of the rim by a suitable tool $q$, which hooks on one of the spokes and keeps the bead of the cover lifted out of the rim. The hook $h$ is inserted under the bead, care being taken that the shoulder $h^1$ bears against the rim. The ring $d$ is then passed on to the hub of the wheel and the apparatus is turned in the direction shown by the arrow, assuming the wheel to remain fixed, or the wheel is turned in the opposite direction assuming the apparatus to remain stationary. The bead of the cover is thus removed from the rim all around the wheel. On the other hand, to replace the tire, after having inserted the bead of the cover in the rim by means of a suitably shaped tool $s$ having its lower part $s'$ spoon-shaped so as to bear without slipping on one of the spokes, the inclined arm $i$ of the cross piece $f$ is inserted so that the shoulder $i'$ bears against the interior edge of the rim; the tool is then turned in the direction of the arrow, Fig. 4, whereby the bead of the cover is pushed back by the inclined plane $i$ and engages progressively in the rim all around the same.

In order to reduce friction at the shoulder $h'$ and the bearing face $i$, the part $f$ may be constructed as shown in Fig. 3. For the said purpose a roller $m$ is fitted in the position of the shoulder $h'$ and the tire replacing bearing face is formed by a roller $n$ disposed above the hooked part $i'$. Further the cross piece carries at right angles to its axis an arm, or two symmetrical arms, $k$, set slightly back relatively to the axis of the tube $a$, said arms being fitted at the end with conical rollers $p$. A roller $o$ fitted under the hooked part $i'$ serves to reduce friction against the inner side of the rim. In this modification moreover the ring $d$ is replaced by a leather strap $r$ which can be buckled and adapted to the hub of each wheel.

The removal of the tire is effected as before described with the difference that, as seen in Fig. 3, the cross piece $f$ now bears against the outer edge or face of the rim through the medium of the roller $m$, which greatly eases and facilitates the operation and has the advantage of not damaging the rim. On the other hand, for replacing the cover, the tube $a$ is, as shown in Figs. 3 and 4, turned so that the arm $k$ carrying the roller $p$ first lifts the bead of the cover (see Fig. 4) and at the same time diverts it toward the roller $n$ which in its turn pushes it back into the rim as seen in Fig. 3, while the curved end of the part $i$ pushes back the air tube which thus cannot be nipped or jammed. To avoid turning the tube $a$ around 180° on its axis the piece $f$ may have arms with rollers $p$ at both sides. Instead of bending the tube $a$ into a handle, the latter may be formed by fitting a T-tube $t$ to the tube $a$ as shown in Fig. 4ª. The part $f$ may likewise be made adjustable along the tube $a$ by forming the latter with holes to receive the fixing pin $q$.

What I claim and desire to secure by Letters Patent is:—

1. An apparatus for mounting and removing pneumatic tires comprising an inner member adapted to rotatively engage the hub of the wheel, an outer member slidingly engaging the inner member, and a cross piece on the outer member comprising at one side an outward hook $h$ adapted for engagement with the inner face of the bead of the tire and a shoulder for bearing against the outer face of the rim to cause the removal of said bead from within the rim and at the other side an inward hook $i'$ adapted for engagement with the inner face of the edge of the rim and having a face $i$ inclined inwardly for guiding the edge of the tire inward.

2. An apparatus for mounting and removing pneumatic tires comprising an inner member adapted to rotatively engage the hub of the wheel, an outer member slidingly engaging the inner member, and a cross piece on the outer member comprising at one side an outward hook $h$ adapted for engagement with the inner face of the bead of the tire and a shoulder for bearing against the outer face of the rim to cause the removal of said bead from within the rim, said shoulder carrying an anti-friction wheel and at the other side an inward hook $i'$ adapted for engagement with the inner face of the edge of the rim and having a face $i$ inclined inwardly for guiding the edge of the tire inward and a roller $n$ disposed to engage the outer face of the bead of the tire at a point radially outward from said face $i$ to push the tire into the rim.

3. An apparatus for mounting and removing pneumatic tires comprising an inner member adapted to rotatively engage the hub of the wheel, an outer member slidingly engaging the inner member, and a cross piece on the outer member comprising at one side an outward hook $h$ adapted for engagement with the inner face of the bead of the tire and a shoulder for bearing against the outer face of the rim to cause the removal of said bead from within the rim, said shoulder carrying an anti-friction wheel and at the other side an inward hook $i'$ adapted for engagement with the inner face of the edge of the rim and having a face $i$ inclined inwardly for guiding the edge of the tire inward and a roller $n$ disposed to engage the outer face of the bead of the tire at a point radially outward from said face $i$ to push the tire into the rim, and a roller $q$ in position to support the edge of the tire outside of the rim at a point in advance of the pushing roller $n$.

In witness whereof, I have hereunto signed my name in the presence of two subscribing witnesses.

LOUIS FELIX CARLE.

Witnesses:
 EDWARD AUSTIN WELDEN,
 GABRIEL BELLIARD.